US006195364B1

(12) United States Patent
Brodigan

(10) Patent No.: US 6,195,364 B1
(45) Date of Patent: Feb. 27, 2001

(54) VSDL MULTIPLE SERVICE PROVIDER INTERFACE

(75) Inventor: Donald L. Brodigan, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/379,412

(22) Filed: Aug. 24, 1999

(51) Int. Cl.[7] .............................. H04L 12/66; H04J 1/00; H04J 3/16

(52) U.S. Cl. ......................... 370/463; 370/480; 370/466; 370/487; 375/222

(58) Field of Search ..................................... 370/343, 344, 370/359, 401, 410, 419, 420, 463, 466, 467, 469, 480, 485, 486, 487, 493, 532, 535, 537; 375/222; 379/93.01, 93.05, 93.06, 93.07

(56) References Cited

U.S. PATENT DOCUMENTS

| | | | |
|---|---|---|---|
| 5,790,548 | * | 8/1998 | Sistanizadeh et al. ............... 370/401 |
| 6,058,442 | * | 5/2000 | Ayanoglu ............................. 709/226 |
| 6,091,735 | * | 7/2000 | Dodson et al. ...................... 370/420 |

* cited by examiner

Primary Examiner—David R. Vincent
(74) Attorney, Agent, or Firm—Brooks & Kushman P.C.

(57) ABSTRACT

A VDSL broadband communication network is provided with a single standard business system interface that supports multiple video/data service providers. A network entitlement manager is responsible for establishing a VIP/DSP service on the VDSL broadband network once the service is authorized externally by the service provider. Each VIP/DSP includes a service provider entitlement manager for authorizing their own services, and is provided with a unique business system interface code that facilitates connection of multiple VIP/DSP entitlement managers to a single network entitlement manager using a standard ACC4000D protocol over the network business system interface. The unique code allows differentiation between various service providers when adding, changing or deleting service STB or data device entitlements to a customer entitlement profile stored in the BDT serving that customer. The network entitlement manager manage all of the ATM PVC's for each VIP/DSP video and data VPI/VCI assignments including the data rate. When authorized by a service provider, entitlements are sent from the service provider entitlement manager to the network entitlement manager, and forwarded to a BDT for updating of the customer entitlement profile.

14 Claims, 2 Drawing Sheets

VSDL MULTIPLE SERVICE PROVIDER INTERFACE

TECHNICAL FIELD

The present invention generally relates to broadband VDSL based communication networks having combined broadband and narrowband services, and more particularly to an improved system architecture and method capable of supporting multiple service providers provisioning their own customers over a single network interface.

BACKGROUND ART

VDSL (Very high speed Digital Subscriber Line) is a packet-based transmission architecture used to provide extremely high bandwidth distribution of digital video and data signals to customer buildings. A VDSL-based architecture can advantageously provide a single platform for supporting bandwidth-intensive applications, such as Internet access, remote LAN access, video conferencing, and video-on-demand.

VDSL services are typically implemented in an asymmetric form having a downstream transmission capability of about 52 Mbps over twisted pair copper wire arranged in local loops of 300 m, 26 Mbps at 1,000 m, and 13 Mbps at 1,500 m. Upstream data rates in asymmetric implementations tend to range from about 1.6 Mbps to about 2.3 Mbps. A typical distribution network includes a central office equipped with a host digital terminal (HDT) and arranged to operate as hub between multiple video information providers (VIPs) and digital service providers (DSPs) and customer residential dwellings. In a fiber-to-the-neighborhood (FTTN) type distribution network, optic fiber (e.g. OC-3c and OC-12c) lines are used to connect the central office to a universal system access multiplexer (USAM), which is then connected to a network interface device (NID) located on the customer property via twisted pair copper wire. A dedicated VDSL loop extends between the NID and an individual customer residence using an existing POTS or telephone system twisted pair wire, and a customer interface device, such as a residential gateway or set top box, provides a connection point for a customer television or personal computer. A fiber-to-the-curb (FTTC) type distribution network is similar except that a broadband network unit (BNU) is used in place of the USAM, and coaxial cable is used to connect the BNU, NID, and set top box.

In any distribution network, a primary focus is the ability to provide a secure and efficient transport of services from multiple outside service providers, such as video information providers (VIP) and data service providers (DSP), over the network. To date, known VDSL broadband networks utilize a single platform entitlement manager that enables a single VIP/DSP to provision customers for receipt of video and data service on the VDSL broadband network. Although multiple VIP/DSP can be provisioned by the single platform entitlement manager, there is only one external billing and provisioning business system interface, and all VIP/DSP would be required to use this interface. Numerous disadvantages to such an arrangement are outlined below.

One such disadvantage results from the fact that customer set-top box (STB) IP address assignment associated with each VIP/DSP is handled by the respective VIP/DSP, and is sent over the network ATM system to the network entitlement manager for subsequent processing and assignment to the customer. The entitlement manager also uses an IP address to all of the BDT for provisioning and monitoring of video/data services. As a result, the use of two IP addresses creates a security problem on VDSL broadband network provider. It also complicates the ability for multiple VIP to assign IP addresses of their own and keep them all separated as part of their maintaining their own security and administration.

Another disadvantage arises when a VIP/DSP wants to inventory STBs connected to the entitlement manager. To perform such inventorying, the external billing system is arranged to send an add new set top command. In general, the VDSL network has no need to receive such an STB Inventory message. In addition, such inefficient use of the network is further magnified when each one of a multiple number of service providers perform their own inventory, thereby generating a large quantity of unnecessary network traffic.

Yet another disadvantage results from credit limits and Impulse Pay Per View (IPPV) service that the VIP provides. In general, a customer sends a request for such services to the service provider. The service provider then must pass authorization through the network to the customer's STB. However, for security and efficient use of the network, such service should be controlled directly by the VIP and otherwise transparent to the VDSL network entitlement manager. However, the use of the entitlement manager involves network management. In addition, ATM virtual path identifiers/virtual channel identifiers (VPI/VCI) are presently administered from a single entitlement manager that is under the control of a single VIP. Such an arrangement presents difficulties for efficiently supporting multiple VIP/DSP.

Therefore, a need exists for a secure arrangement in a VDSL distribution network that overcomes the above-noted problems and allows multiple service providers to provision customers for receipt of services in a transparent manner to the network entitlements manager.

DISCLOSURE OF INVENTION

Therefore, it is an object of the present invention to provide a VDSL broadband communication network having a single standard business system interface that supports multiple video/data service providers.

It is another object of the present invention to provide a VDSL broadband communication network that uses a standard ACC4000D protocol over TCP/IP to enable a service provider to provision their own customer's service using a single interface to a network entitlement manager.

It is yet another object of the present invention to provide a VDSL network and method for interfacing multiple service providers by arranging the network to provision and administer customer entitlement profiles and VPI/VCI assignments for both video and data service to all BDT, while actual service authorization is performed under sole control of the service provider.

In accordance with these and other objects, the present invention provides a VDSL based broadband communication network having a network ATM system connected to at least one video or data service provider for passing service provider signaling through the VDSL broadband network to customer locations, and a network entitlement manager connected to a digital terminal for maintaining a customer entitlement profile in the digital terminal. An external service provider entitlement manager is located at the at least one video or data service provider for authorizing customer requests to add or modify a service received through the VDSL broadband network, and a system interface is provided between the network entitlement manager and the service provider manager using an ACC4000D protocol. The service provider entitlement manager is arranged to signal the network entitlement manager after authorization of the customer request to update the customer profile stored in the digital terminal.

With the present invention, the network entitlement manager is arranged to assign a soft permanent virtual circuit (PVC) to allow for service connection through the VDSL network when the customer profile is updated. To accommodate multiple service providers on a single business interface, each service provider entitlement manager is arranged to send signals on the interface with a unique business system interface code. Each service provider entitlement manager is arranged to provision a customer video or data device as part of a customer request, while the network entitlement manager maintains control over network connections. The system of the present invention is equally adaptable to either FTTC or FTTN networks.

In accordance with another aspect of the present invention, a method is provided for interfacing multiple service providers to a VDSL based broadband communication network, wherein the method includes passing all requests relating to receipt of services from one or more service providers through the VDSL network for processing and authorization by an external service provider entitlement manager, receiving authorization from the service provider at a network entitlement manager using a ACC4000D protocol, and updating a customer entitlement profile stored in a network digital terminal in response to the received authorization.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
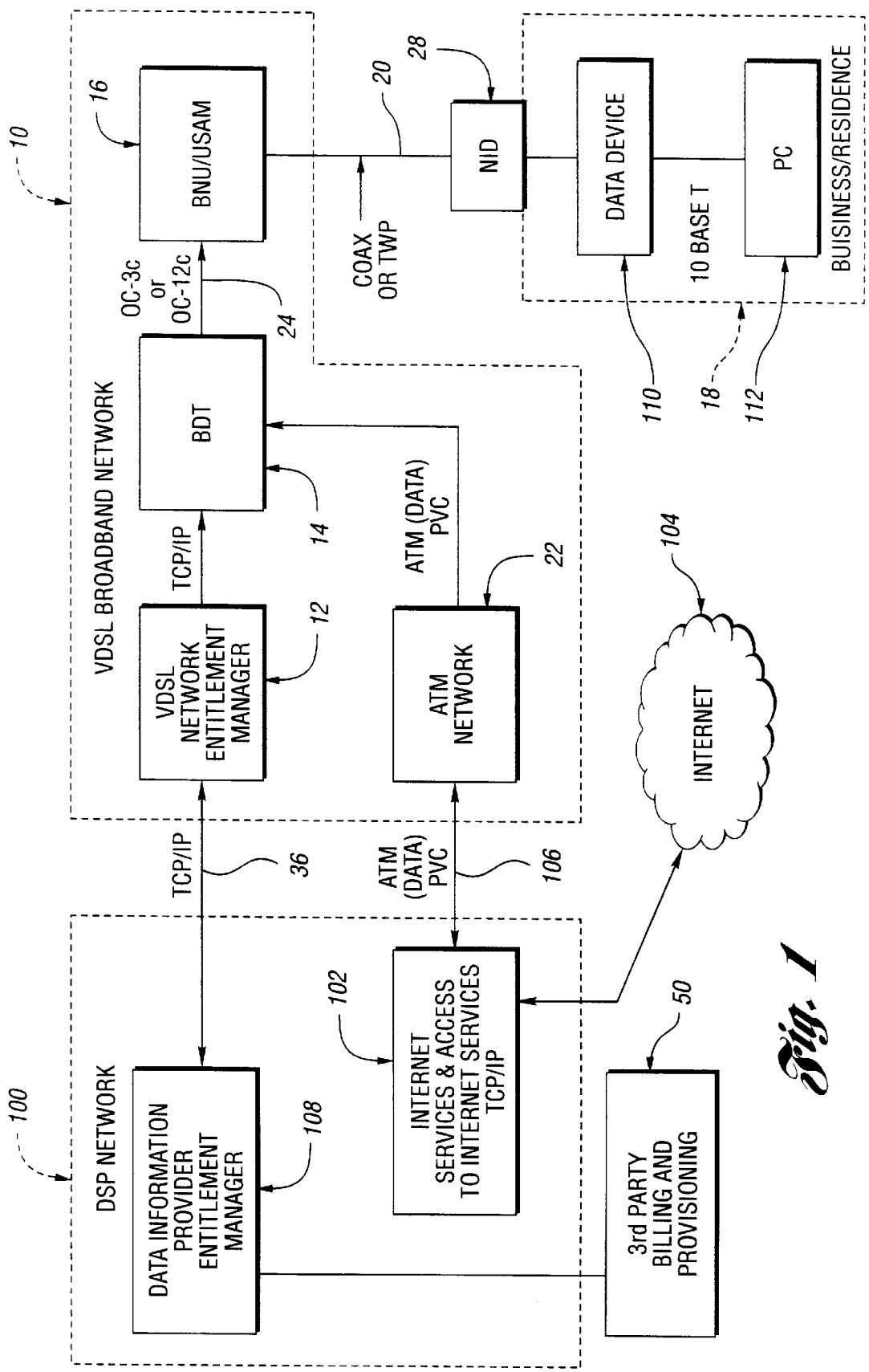
FIG. 1 is a block diagram of a VDSL-based distribution communication network for supporting a video service provider in accordance with the present invention.

Referring to FIG. 1, a VDSL broadband communication network 10 is shown having a standard multiple video service provider business system interface in accordance with an exemplary embodiment of the present invention. More specifically, the network includes a network entitlement manager 12 coupled to one or more broadband digital terminals 14, which are in turn coupled to one or more USAM or BNU 16 located near a customer business/residential site 18 via a coaxial or twisted-pair copper cable 20. The network entitlement manager controls a customer entitlement profile maintained at each BDT to control the programming content received by the customer. As noted previously, a USAM is used in a FTTN type network configuration, while a BNU is used in a FTTC type network configuration. More specifically, a USAM is located near the customer site within 4,000 feet (≈1220 m) of a central point of connection service panel mounted in the building. A BNU is typically located deeper in the network, such as within 150 feet of the customer building. The USAM or BNU are arranged to operate as a single platform for voice, video, and data signals.

The network further includes an asynchronous transfer mode (ATM) network 22 for supporting ATM protocol traffic to and from the BDTs. ATM is a broadband switching arrangement for transporting fixed-length cells via permanent or switched virtual circuit (PVC or SVC) connections. Such a protocol requires ATM framing of the signals to include a timing signal used by a receiving unit decoder to decode the signal payload. The virtual circuit connections on the network are controlled by the network entitlement manager. The BDTs are connected to the BNUs/USAMs via a fiber optic cable 24 such as an OC3c or OC12c cable.

Each customer site includes a set-top boxes (STB) 26 connected to a BNU/USAM via a network interface device (NID) 28 for processing video signals for output on a television, VCR, or like equipment 30.

In accordance with the present invention, a VIP (only one is shown for clarity) 32 includes a headend having an VIP entitlement manager 34 connected to the network entitlement manager 12 via a standard VDSL business system interface 36 based on General Instrument's ACC4000D protocol. As described below, this interface supports transmission control protocol (TCP)/Internet protocol (IP) traffic. VIP entitlement manager 34 is also connected directly to ATM network 22 via an ATM link 38 to support a network data carousel (a channel programming guide) permanent virtual channel (PVC). The VIP entitlement manager is also connected to a VIP-side ATM switching network 40 via a TCP/IP link 42 for supporting IPPV communication with ATM network 22 via another PVC 44. Video programming is broadcast from at least one video source 46 using for example an MPEG 2 encoder 38 connected to ATM network 22 via an ATM PVC link 48. Finally, the VIP entitlement manager is also connected to a third party billing and provisioning system 50. Appropriate PVCs are provided between ATM 22 and BDT 14 to allow signals to pass through the network to the customer.

In accordance with the present invention, network entitlement manager 12 is arranged to carry out only the functions that pertain to the network, while the VIP entitlement manager 34 is arranged to carry out the functions that pertain to the services provided by that particular VIP. The interface between the VIP entitlement manager and the network entitlement manager is provided using the standard ACC4000D protocol to support TCP/IP traffic. This arrangement allows the network to support multiple VIP/DSP, while allowing each VIP/DSP to provision their own customer's video or data service.

In accordance with the present invention, a VIP can choose to have the third party billing system 50 perform their STB Inventory, billing and provisioning, or a stand alone STB Inventory, billing and provisioning system can be provided with a standard business system interface using the ACC4000D protocol over TCP/IP to the network entitlement manager. User billing, credit authorization for Pay Per View (PPV) and IPPV is therefore under total control of the VIP.

Figure 2:
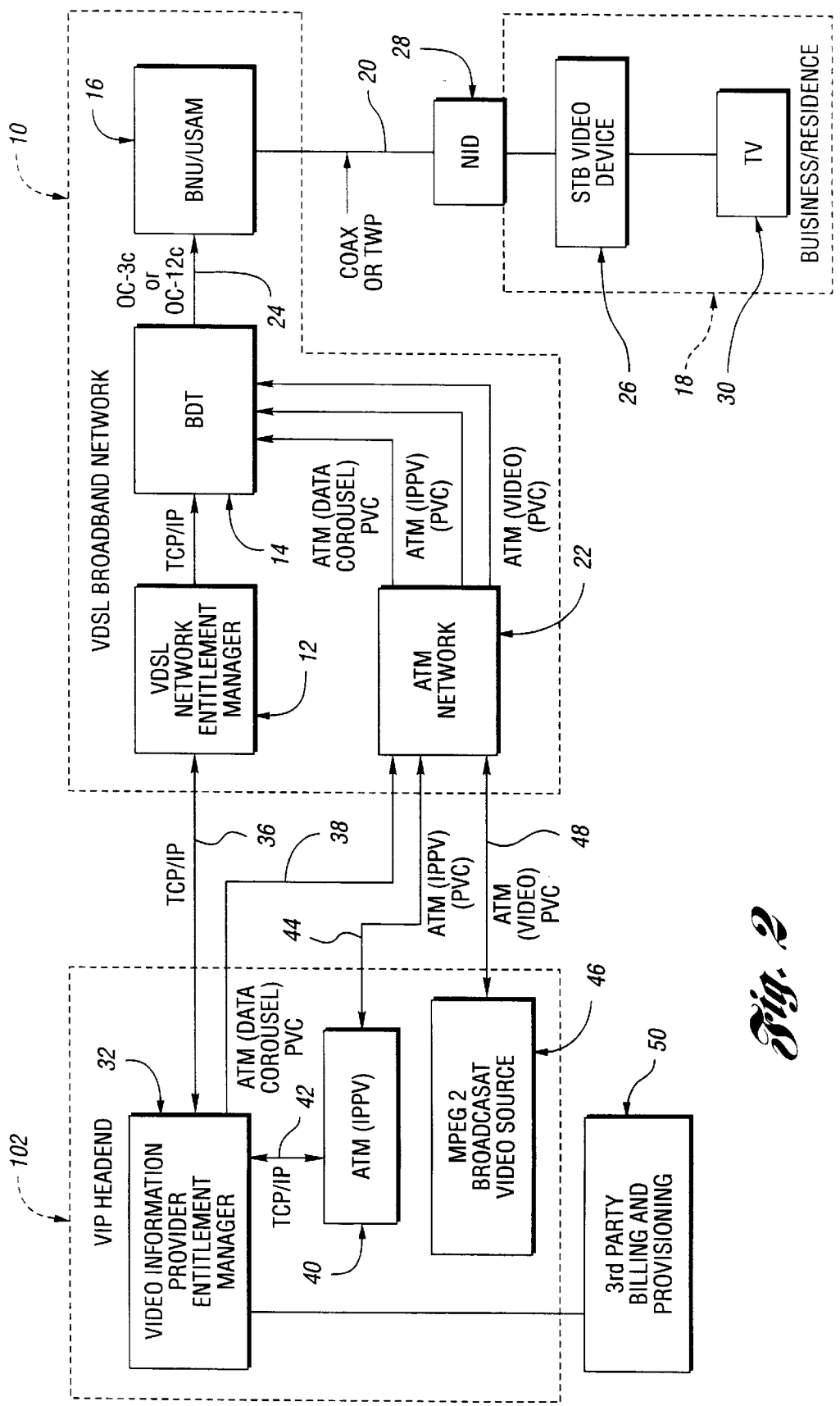
FIG. 2 is a block diagram of a VDSL-based distribution communication network for supporting a data service provider in accordance with the present invention.

FIG. 2 shows an interface with a DSP 100, where like elements to those in FIG. 1 have been denoted with the same reference numeral. In addition, as with the VIP of FIG. 1, only one DSP is shown for clarity. As shown in FIG. 2, the DSP includes an Intranet system and server 102 for controlling access to both DSP services and the Internet 104 via an ATM PVC data link 106 with ATM network 22. The Internet link supports TCP/IP traffic. A DSP entitlement manager 108 is connected to the network entitlement manager 12 via standard business system interface 36 as well as third party billing and provisioning system 50. At the customer site, the STB would include a suitable data device 110 having a 10 Base T port for connection to a personnel computer 112.

In operation, a customer seeking service authorization sends a request to either the VIP or DSP via the network BDT and ATM network. The VIP/DSP then performs all service/credit authorization external to the network and provides appropriate updates to their entitlement manager. The service provider entitlement manager then sends entitlement authorization to the network entitlement manager via the standard business system interface. Network entitlement manager 12 then adds the entitlement to the customer profile stored in the BDT and assigns a soft PVC for allowing the connection. Thus, the VIP/DSP will only send authorization to the network entitlement manager when their billing requirements have been met. STB IP addresses are under total control of the VIP and therefore do not present the security problems that exist on a single platform with an IP address between the network entitlement manager and the BDT.

Network entitlement manager 12 is responsible for establishing a VIP/DSP service on the VDSL broadband network once the service is authorized by the service provider. Each VIP/DSP is provided with a unique business system interface code that facilitates connection of multiple VIPs/DSPs to the single business system interface 36. The unique code allows differentiation between various service providers when adding, changing or deleting service, STB, or data device entitlements to a customer entitlement profile stored in the BDT serving that customer. The network entitlement will also manage all of the ATM PVC's for each VIP/DSP video and data VPI/VCI assignments including the data rate. For example, when authorized by a VIP, PPV and IPPV entitlements are sent from the VIP entitlement manager to the network entitlement manager, and forwarded to the BDT for addition to the customer entitlement profile.

ACC4000D command sets supported across the business system interface to the network entitlement manager include the following: 001 Synchronization; 602 Date/Time sequence number synchronization; 630 download (ADD)/digital events; 631 Download (Modify) digital events; 633 Download (Delete) digital events; 660 Add new STB; 662 Change STB service; 663 Delete digital set top; 664 Initialize digital set top; 665 Clear parental lock; 666 Change set top activation; 680 Change set top features; and 694 PPV authorization update. Additional command sets can be added if desired.

Thus, by using a standard billing system interface with the ACC4000D protocol to the VDSL network entitlement manager, a simple interface arrangement is provided that allows any VIP/DSP to build their own entitlement manager platform and billing system as well as use a third party system like CSG for their STB inventory, billing and provisioning. Network efficiency is increased because command sets will only be sent from the service provider entitlement manager when adding, changing or deleting service, and only the command set required for that function will be sent.

In addition, by advantageously providing centralized control of customer entitlements, the present invention prevents fraud by insuring only an authorized customer site can access provisioned channels. The service provider only needs to notify the network entitlement manager through the single business interface that a particular customer site is actually authorized to access the desired services.

While the best mode for carrying out the invention has been described in detail, those familiar with the art to which this invention relates will recognize various alternative designs and embodiments for practicing the invention as defined by the following claims.

What is claimed is:

1. A VDSL based broadband communication network comprising:
   a network ATM system connected to at least one video or data service provider for passing service provider signaling through the VDSL broadband network to customer locations;
   a network entitlement manager connected to a digital terminal for maintaining a customer entitlement profile in the digital terminal;
   a service provider entitlement manager located at the at least one video or data service provider for authorizing customer requests to add or modify a service received through the VDSL broadband network; and
   an interface between the network entitlement manager and the service provider manager using an ACC4000D protocol, wherein the service provider entitlement manager is arranged to signal the network entitlement manager after authorization of the customer request to update the customer profile stored in the digital terminal.

2. The system of claim 1 wherein the network entitlement manager is arranged to assign a soft permanent virtual circuit (PVC) to allow for service connection through the VDSL network when the customer profile is updated.

3. The system of claim 1 wherein each service provider entitlement manager is arranged to send signals on the interface with a unique business system interface code.

4. The system of claim 1 wherein each service provider entitlement manager is arranged to provision a customer video or data device as part of a customer request.

5. The system of claim 4 wherein the network entitlement manager is arranged to assign a soft permanent virtual circuit (PVC) to allow for service connection through the VDSL network when the customer profile is updated.

6. The system of claim 4 wherein the customer device comprises a set top box.

7. The system of claim 1 further comprising a broadband network unit coupled to the at least one digital terminal via a fiber optic cable, and a network interface device for connecting the customer to the VDSL network.

8. The system of claim 1 further comprising a universal system access multiplexer coupled to the at least one digital terminal via a fiber optic cable, and a network interface device for connecting the customer to the VDSL network.

9. A method for interfacing multiple service providers to a VDSL based broadband communication network comprising:
   passing all requests relating to receipt of services from one or more service providers through the VDSL network for processing and authorization by an external service provider entitlement manager;
   receiving authorization from the service provider at a network entitlement manager using a ACC4000D protocol; and
   updating a customer entitlement profile stored in a network digital terminal in response to the received authorization.

10. The method of claim 9 further comprising assigning under control of the network entitlement manager a soft permanent virtual circuit (PVC) to allow for service connection through the VDSL network when the customer profile is updated.

11. The method of claim 9 further comprising sending signals on the interface from each service provider entitlement manager using a unique business system interface code.

12. The method of claim 9 further comprising provisioning a customer video or data device under control of an external service provider entitlement manager in response to a customer request.

13. The method of claim 12 further comprising assigning under control of the network entitlement manager a soft permanent virtual circuit (PVC) to allow for service connection through the VDSL network when the customer profile is updated.

14. The method of claim 12 wherein provisioning the customer device comprises provisioning a set top box.

* * * * *